United States Patent
Seol et al.

(10) Patent No.: US 11,171,322 B2
(45) Date of Patent: Nov. 9, 2021

(54) POSITIVE ELECTRODE HAVING IMPROVED PORE STRUCTURE IN POSITIVE ELECTRODE ACTIVE MATERIAL LAYER

(71) Applicant: LG Chem, Ltd., Seoul (KR)

(72) Inventors: Jong Heon Seol, Daejeon (KR); Min Hee Lee, Daejeon (KR); Dong Kyu Kim, Daejeon (KR); Jae Woong Kim, Daejeon (KR); Ye Lin Kim, Daejeon (KR); Sang Hoon Choy, Daejeon (KR); Je Young Kim, Daejeon (KR); Sun Kyu Kim, Daejeon (KR)

(73) Assignee: LG Chem, Ltd.

( * ) Notice: Subject to any disclaimer, the term of this patent is extended or adjusted under 35 U.S.C. 154(b) by 526 days.

(21) Appl. No.: 15/747,367

(22) PCT Filed: Dec. 8, 2016

(86) PCT No.: PCT/KR2016/014352
§ 371 (c)(1),
(2) Date: Jan. 24, 2018

(87) PCT Pub. No.: WO2017/099481
PCT Pub. Date: Jun. 15, 2017

(65) Prior Publication Data
US 2018/0219212 A1  Aug. 2, 2018

(30) Foreign Application Priority Data

Dec. 10, 2015 (KR) .................. 10-2015-0176255
Dec. 7, 2016 (KR) .................. 10-2016-0166124

(51) Int. Cl.
*H01M 4/133* (2010.01)
*H01M 4/505* (2010.01)
(Continued)

(52) U.S. Cl.
CPC .......... *H01M 4/133* (2013.01); *H01M 4/131* (2013.01); *H01M 4/364* (2013.01); *H01M 4/505* (2013.01);
(Continued)

(58) Field of Classification Search
CPC .... H01M 4/133; H01M 4/625; H01M 10/052; H01M 4/364; H01M 4/131; H01M 4/622;
(Continued)

(56) References Cited

U.S. PATENT DOCUMENTS 9,825,283 B2    11/2017  Kim et al.
2006/0222952 A1  10/2006  Kono et al.
(Continued)

FOREIGN PATENT DOCUMENTS

CN  101002350 A  7/2007
CN  103208610 A  7/2013
(Continued)

OTHER PUBLICATIONS

Machine translation of WO2015-047042, Kim et al., 2015 (Year: 2015).*
(Continued)

*Primary Examiner* — Kwang Han
(74) *Attorney, Agent, or Firm* — Lerner, David, Littenberg, Krumholz & Mentlik, LLP

(57) ABSTRACT

Provided herein are a positive electrode for a secondary battery and a secondary battery including the same. The positive electrode includes a positive electrode active material layer including a positive electrode active material, a conductive material, and a dispersant, wherein the conductive material includes bundle-type carbon nanotubes, units of which have an average strand diameter of 15 nm or less, and the positive electrode active material layer has a packing density of 3.0 g/cc or more, and has an average pore
(Continued)

diameter of 0.1 μm to 0.5 μm at the packing density when a pore size distribution is measured by mercury intrusion porosimetry, and thus may exhibit excellent electrolyte wetting properties. As a result, when the positive electrode is applied to a battery, wetting time of the positive electrode is shortened, and an area of the positive electrode that is not filled with an electrolyte is reduced, resulting in enhanced battery performance.

16 Claims, 5 Drawing Sheets

(51) Int. Cl.
| | | |
|---|---|---|
| *H01M 4/525* | (2010.01) | |
| *H01M 4/62* | (2006.01) | |
| *H01M 10/052* | (2010.01) | |
| *H01M 4/36* | (2006.01) | |
| *H01M 4/131* | (2010.01) | |
| *H01M 10/0525* | (2010.01) | |
| *H01M 4/02* | (2006.01) | |

(52) U.S. Cl.
CPC ............ *H01M 4/525* (2013.01); *H01M 4/622* (2013.01); *H01M 4/625* (2013.01); *H01M 10/052* (2013.01); *H01M 10/0525* (2013.01); *H01M 2004/021* (2013.01); *H01M 2004/028* (2013.01)

(58) Field of Classification Search
CPC .. H01M 10/0525; H01M 4/505; H01M 4/525; H01M 2004/021; H01M 2004/028; H01M 4/13; H01M 2220/20; H01M 2220/10; H01M 50/20; Y02E 60/10
See application file for complete search history.

(56) References Cited

U.S. PATENT DOCUMENTS

| | | | |
|---|---|---|---|
| 2007/0202410 | A1 | 8/2007 | Takeuchi et al. |
| 2013/0183577 | A1 | 7/2013 | Voillequin et al. |
| 2013/0183583 | A1 | 7/2013 | Kim et al. |
| 2013/0248757 | A1 | 9/2013 | Shim et al. |
| 2013/0330623 | A1 | 12/2013 | Matsushita et al. |
| 2013/0337326 | A1 | 12/2013 | Mun et al. |
| 2015/0010784 | A1 | 1/2015 | Takahata et al. |
| 2015/0104701 | A1 | 4/2015 | Azami |
| 2015/0104704 | A1 | 4/2015 | Kim et al. |
| 2015/0162598 | A1* | 6/2015 | Kim ................. H01M 4/364 429/223 |
| 2015/0273441 | A1 | 10/2015 | Kim et al. |
| 2015/0274529 | A1* | 10/2015 | Kim ................. B01J 23/882 428/367 |
| 2016/0221828 | A1 | 8/2016 | Shibuya |
| 2016/0325998 | A1 | 11/2016 | Kang et al. |

FOREIGN PATENT DOCUMENTS

| | | | | |
|---|---|---|---|---|
| CN | 104471759 | A | | 3/2015 |
| CN | 104870363 | A | | 8/2015 |
| JP | 2005075661 | A | | 3/2005 |
| JP | 2006086116 | A | * | 3/2006 ............ H01M 10/05 |
| JP | 2006086116 | A | | 3/2006 |
| JP | 2006134777 | A | | 5/2006 |
| JP | 2011192620 | A | | 9/2011 |
| JP | 2013171816 | A | | 9/2013 |
| JP | 2013201120 | A | | 10/2013 |
| JP | 2014179292 | A | | 9/2014 |
| JP | 2015525950 | A | | 9/2015 |
| JP | 2015528181 | A | | 9/2015 |
| JP | 2015195143 | A | | 11/2015 |
| JP | 2017501961 | A | | 1/2017 |
| KR | 20120009891 | A | | 2/2012 |
| KR | 20150016852 | A | | 2/2015 |
| KR | 1020150016852 | | * | 2/2015 ............... C01B 2/31 |
| KR | 20150025665 | A | | 3/2015 |
| WO | 2015045427 | A1 | | 4/2015 |
| WO | 2015047042 | A1 | | 4/2015 |
| WO | 2015105302 | A1 | | 7/2015 |

OTHER PUBLICATIONS

Machine translation of JP 2006-086116A, Sotowa et al., 2006 (Year: 2006).*
Machine translation of KR 1020150016852, Kim et al., 2015 (Year: 2015).*
Chinese Search Report for Application No. CN 201680047594.9 dated Apr. 14, 2020, 3 pages.
Third Party Observation for Japanese Application No. 2018524817 dated May 11, 2020; 5 pages.
Search report from International Application No. PCT/KR2016/014352, dated Mar. 20, 2017.
Extended European Search Report for Application No. EP16873346.7 dated May 29, 2018.

* cited by examiner

[FIG. 1]
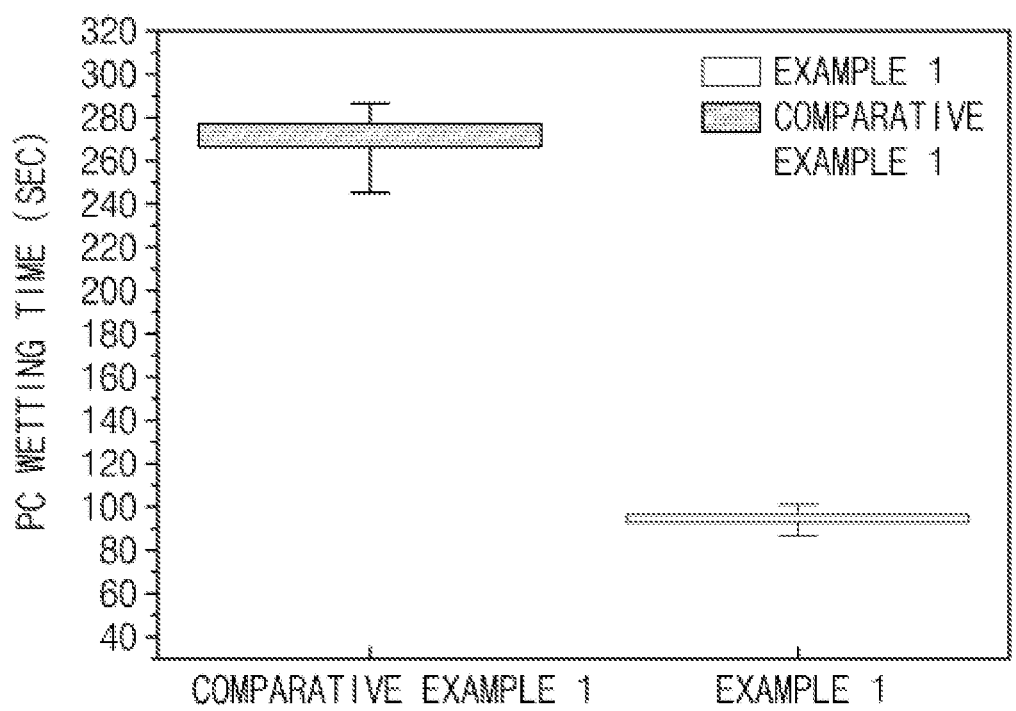

[FIG. 2]
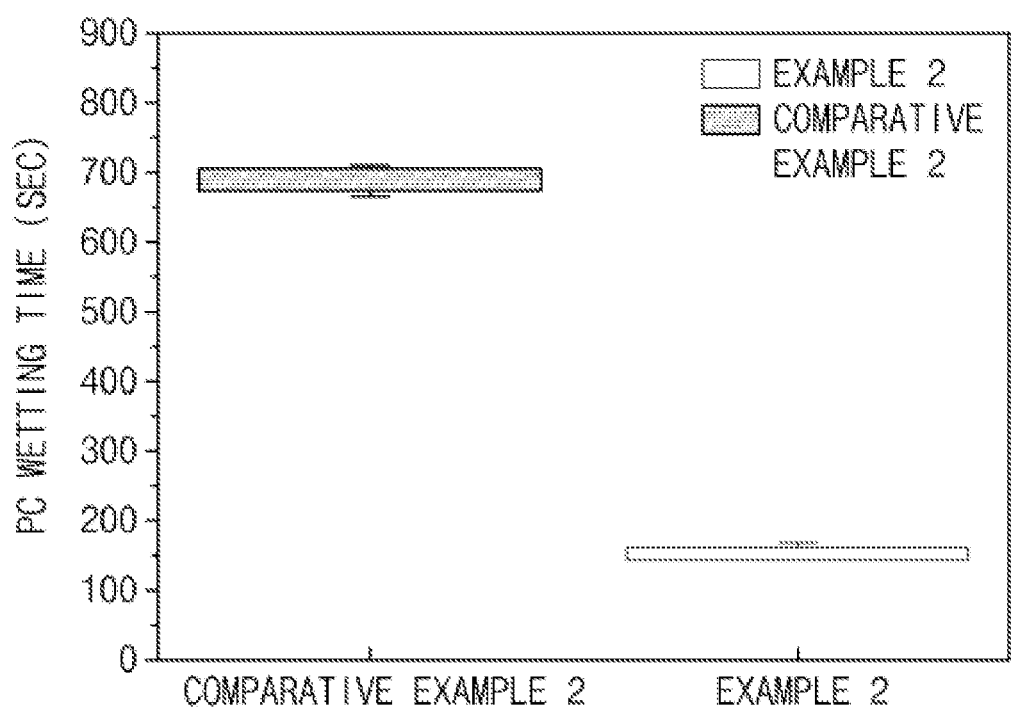

[FIG. 3]
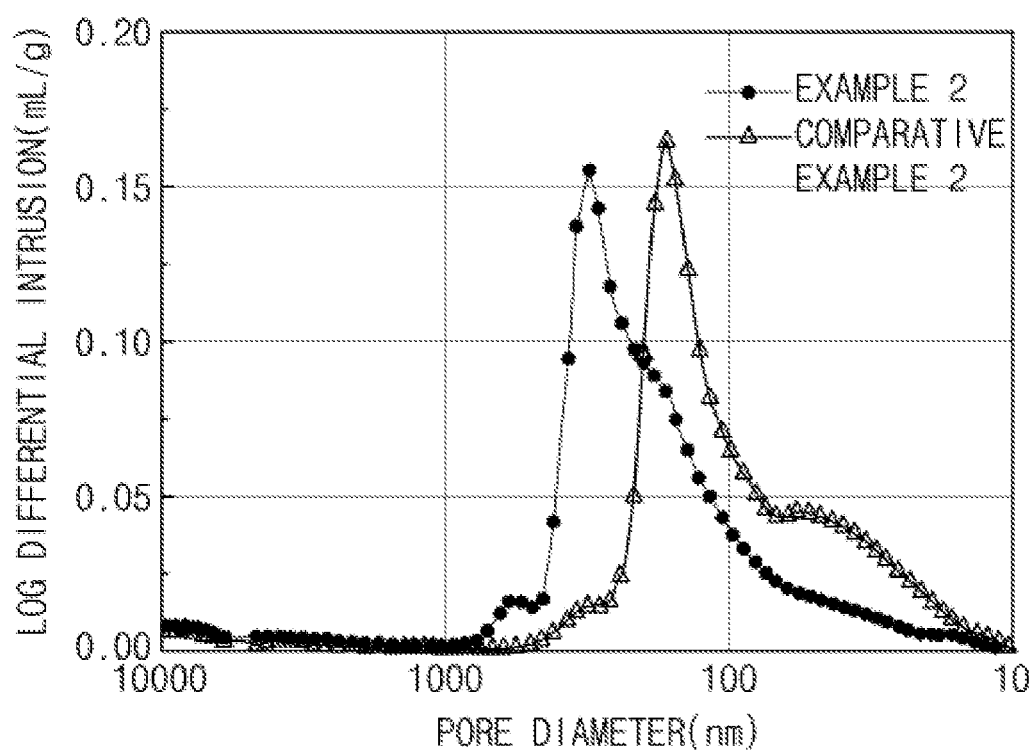

[FIG. 4]
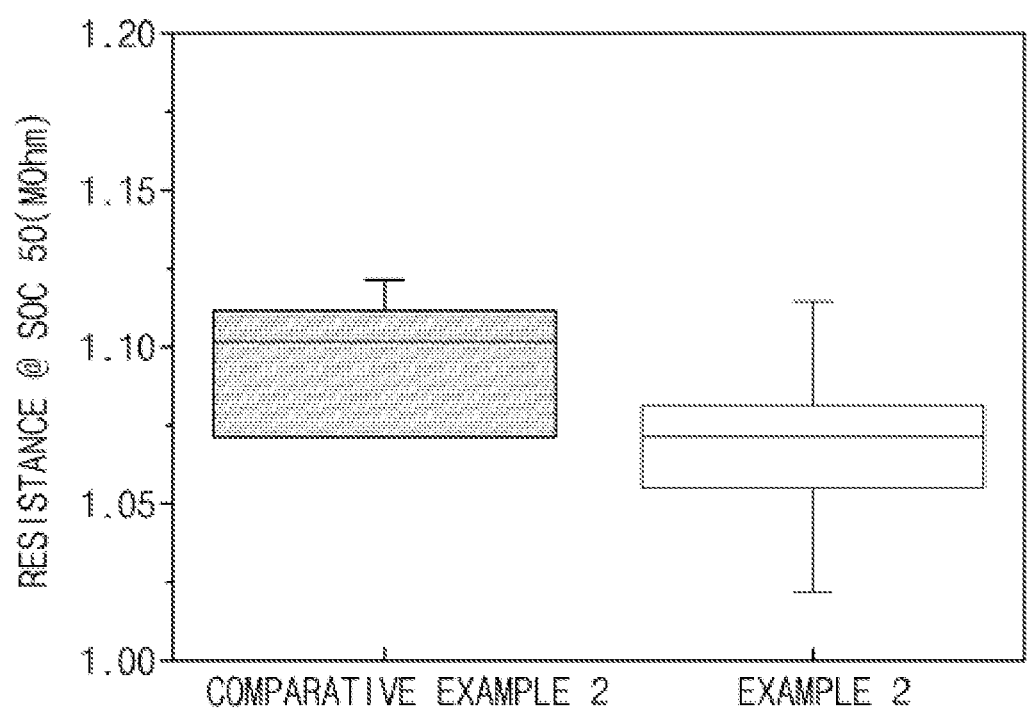

[FIG. 5]
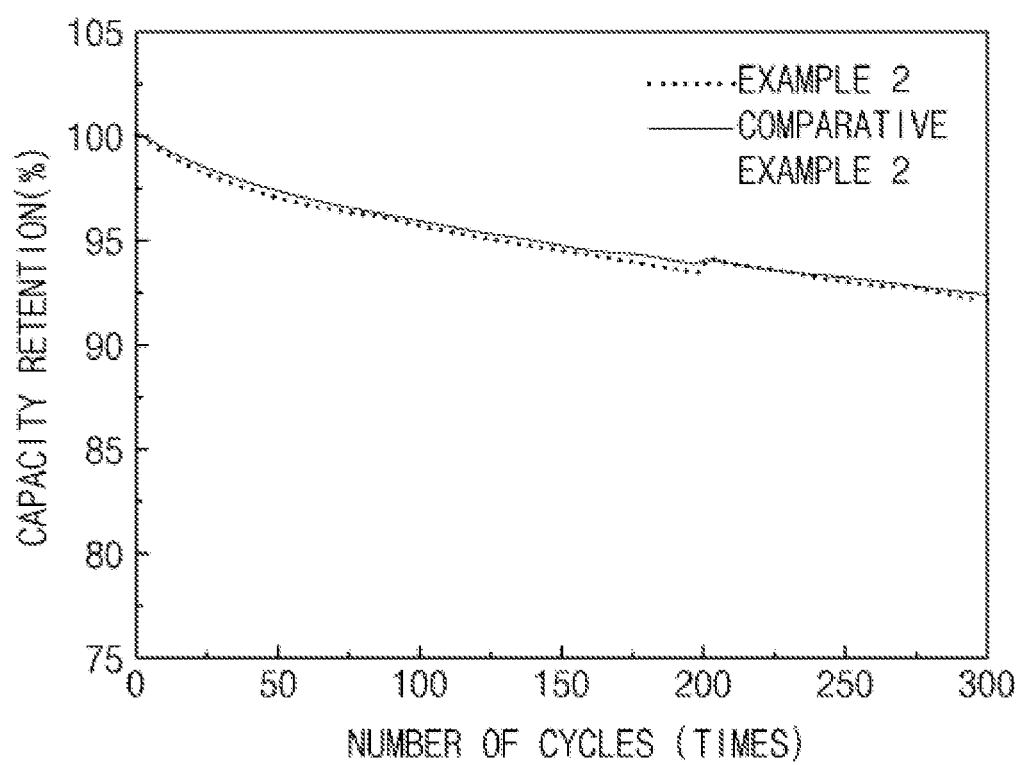

POSITIVE ELECTRODE HAVING IMPROVED PORE STRUCTURE IN POSITIVE ELECTRODE ACTIVE MATERIAL LAYER

CROSS-REFERENCE TO RELATED APPLICATION

The present application is a national phase entry under 35 U.S.C. § 371 of International Application No. PCT/KR2016/014352, filed Dec. 8, 2016, which claims priority from Korean Patent Application Nos. 10-2015-0176255, filed on Dec. 10, 2015, and 10-2016-0166124, filed on Dec. 7, 2016, all of which are incorporated herein by reference.

TECHNICAL FIELD

The present invention relates to a positive electrode for a secondary battery which has an improved pore structure and thus exhibits excellent electrolyte wetting properties, and a secondary battery including the same.

Background Art

In line with an increase in technology development of and demand for mobile devices, demand for secondary batteries as energy sources is rapidly increasing. Among these secondary batteries, lithium secondary batteries which have high energy density, a high voltage, a long cycle lifespan, and a low self-discharge rate are commercially available and widely used. In addition, research into a method of manufacturing an electrode having increased energy density per unit volume by enhancing electrode density is actively being conducted.

Generally, high-density electrodes are fabricated by molding electrode active material particles having a size of several micrometers to tens of micrometers using a high-pressure press, and thus the electrode active material particles are deformed, an inter-particle space is reduced, and permeation of an electrolyte into such an electrode is likely to be decreased.

To address these problems, a conductive material having excellent electrical conductivity and high strength is used to fabricate an electrode. When a conductive material is used in fabrication of an electrode, the conductive material is dispersed between compressed electrode active material particles, and thus micropores are maintained between the active material particles, resulting in facilitated permeation of an electrolyte, and resistance in the electrode may be reduced due to high conductivity of the conductive material. Among these conductive materials, a fibrous carbon-based conductive material capable of further reducing electrode resistance by forming an electrical conduction path in an electrode, i.e., carbon nanotubes, is increasingly used.

Carbon nanotubes, which are a type of fine carbon fiber, refer to tube-type carbon having a diameter of 1 μm or less, and are applied to a variety of fields and expected to be commercially available due to high conductivity, high tensile strength, and high thermal resistance, derived from a characteristic structure thereof. However, in spite of such usefulness of carbon nanotubes, carbon nanotubes are limited in their use due to low solubility and low dispersibility thereof. Thus, when an electrode is fabricated using carbon nanotubes, the carbon nanotubes are used after being previously dispersed in a solvent, to prepare a composition for forming an electrode. However, carbon nanotubes are unable to be stably dispersed in a solvent due to strong van der Waals attraction therebetween and agglomerate with each other.

Various attempts have been made to address these problems. In particular, a method of dispersing carbon nanotubes in a solvent through mechanical dispersion treatment such as ultrasonic treatment, or the like has been proposed. However, when this method is used, dispersibility of carbon nanotubes is maintained high while carbon nanotubes are irradiated with ultrasonic waves, but the carbon nanotubes start to agglomerate with each other when irradiation of ultrasonic waves is completed, and thus the concentration of the carbon nanotubes increases, resulting in agglomerated carbon nanotubes. In addition, a method of stably dispersing carbon nanotubes using a variety of dispersants has been proposed. However, this method also has a problem in that, when a high concentration of fine carbon fiber is dispersed in a solvent, the viscosity thereof increases, and thus handling becomes difficult.

Therefore, there is a need to develop a method of improving the dispersibility of carbon nanotubes in an electrode without a decrease in conductivity thereof and a method of preparing a carbon nanotube dispersion effective in fabrication of an electrode, using the method.

DISCLOSURE

Technical Problem

An object of the present invention is to provide a positive electrode for a secondary battery which has an improved pore structure and thus exhibits excellent electrolyte wetting properties.

Another object of the present invention is to provide a lithium secondary battery, a battery module, and a battery pack that include the positive electrode.

Technical Solution

According to an embodiment of the present invention, provided is a positive electrode for a secondary battery, the positive electrode including a positive electrode active material layer including a positive electrode active material, a conductive material, and a dispersant, wherein the conductive material includes bundle-type carbon nanotubes, units of which have an average strand diameter of 15 nm or less, wherein the carbon nanotubes have an average value of a ratio (IG/ID) of an intensity (IG) of a maximum peak of a G band at 1,580±50 cm$^{-1}$ to an intensity (ID) of a maximum peak of a D band at 1,360±50 cm$^{-1}$ of 0.7 to 1.7 and a standard deviation of the ratio of 1.3% to 2.0%, the ID and IG being obtained by Raman spectroscopy using a laser with a wavelength of 532 nm, and the positive electrode active material layer has a packing density of 3.0 g/cc or more, and has an average pore diameter of 0.1 μm to 0.5 μm at the packing density when a pore size distribution is measured by mercury intrusion porosimetry, the average pore diameter being calculated by Equation 1 below:

$$\text{Average pore diameter } (P) = 4V/A \quad \text{[Equation 1]}$$

wherein, in Equation 1, V is a pore volume, and A is a pore area.

According to another embodiment of the present invention, a lithium secondary battery, a battery module, and a battery pack including the positive electrode are provided.

Other embodiments of the present invention will be described in detail in the following detailed description.

Advantageous Effects

According to the present invention, a positive electrode for a secondary battery has an improved pore structure in a positive electrode active material layer, and thus may exhibit excellent electrolyte wetting properties. As a result, when the positive electrode is applied to a battery, wetting time of the positive electrode is shortened, and an area of the positive electrode that is not filled with an electrolyte is reduced, resulting in enhanced battery performance.

DESCRIPTION OF DRAWINGS

The following drawings appended to the present specification are intended to illustrate exemplary embodiments of the present invention, and the spirit of the present invention will be more clearly understood from the accompanying drawings together with the following description of the invention, and thus illustrations in the drawings should not be construed as limiting the scope of the present invention.

FIG. 1 is a graph showing evaluation results of propylene carbonate (PC) wetting properties of each of batteries according to Example 1 and Comparative Example 1.

FIG. 2 is a graph showing evaluation results of propylene carbonate (PC) wetting properties of each of batteries according to Example 2 and Comparative Example 2.

FIG. 3 is a graph showing observation results of a pore size distribution in each of positive electrodes according to Example 2 and Comparative Example 2.

FIG. 4 is a graph showing evaluation results of resistance characteristics of the batteries of Example 2 and Comparative Example 2.

FIG. 5 is a graph showing evaluation results of cycle characteristics of the batteries of Example 2 and Comparative Example 2.

BEST MODE

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

Unless otherwise stated, the term "bundle-type" as used herein refers to the arrangement of a plurality of carbon nanotube strands, i.e., carbon nanotube units, in parallel to each other such that longitudinal axes of the units are arranged in substantially the same orientation, or a secondary form such as a spirally wound bundle form or rope form. The term "non-bundle type" or "entangled type" means that a plurality of carbon nanotube units entangle with each other without a certain form regardless of specific orientation.

Recently, according to a need for high capacity and high energy density of secondary batteries, electrodes thereof have been required to become thicker and have increased packing density (or rolling density). However, as the thickness and packing density of an electrode increase, electrolyte wetting properties thereof deteriorate. The deterioration of electrolyte wetting properties at an electrode results in an increase in electrode wetting time and non-uniform electrolyte wetting, and, as a result, charging is not performed in an area of the electrode that is not wet by an electrolyte and, accordingly, battery characteristics deteriorate.

Therefore, in the present invention, carbon nanotubes are used as a conductive material to fabricate a positive electrode, and thus, without deterioration of discharge pulse resistance characteristics and cycle characteristics of a battery, the dispersibility of carbon nanotubes in a positive electrode active material layer may be increased by optimizing the characteristics of the carbon nanotubes, and a pore structure in the active material layer may be improved through this configuration, thereby enhancing electrolyte wetting properties of the positive electrode. Thus, when the positive electrode is applied to a battery, the battery may have significantly enhanced characteristics.

In particular, a positive electrode for a secondary battery, according to an embodiment of the present invention, includes a positive electrode active material layer including a positive electrode active material, a conductive material, and a dispersant, wherein the conductive material includes bundle-type carbon nanotubes, units of which have an average strand diameter of 15 nm or less, the carbon nanotubes having an average value of a ratio (IG/ID) of the intensity (IG) of a maximum peak of a G band at $1,580\pm50$ $cm^{1}$ to the intensity (ID) of a maximum peak of a D band at $1,360\pm50$ $cm^{-1}$ of 0.7 to 1.7 and a standard deviation of the ratio of 1.3% to 2.0%, the ID and IG being obtained by Raman spectroscopy using a laser with a wavelength of 532 nm, and wherein the positive electrode active material layer has a packing density of 3.0 g/cc or more, and has an average pore diameter P of 0.1 μm to 0.5 μm at the packing density when a pore size distribution is measured by mercury intrusion porosimetry, the average pore diameter P being calculated by Equation 1 below:

$$\text{Average pore diameter } P \text{ (μm)} = 4V/A \qquad \text{[Equation 1]}$$

wherein, in Equation 1, V is a pore volume, and A is a pore area.

In this regard, Equation 1 is obtained by modeling from pore volume and pore area obtained from values of a pore size distribution measured by mercury intrusion porosimetry.

More particularly, in the positive electrode for a secondary battery, according to an embodiment of the present invention, the positive electrode active material layer may have a packing density of 3.0 g/cc to 4.3 g/cc, and an average pore diameter according to Equation 1 of 0.1 μm to 0.5 μm, and, more particularly, 0.1 μm to 0.3 μm at the packing density.

Generally, as a packing density in a positive electrode active material layer increases, the size of pores in the active material layer tends to decrease. However, the positive electrode for a secondary battery according to the present invention has a large pore size even at a high packing density as described above. In addition, the positive active material layer has the pore size distribution within the above-described range, and thus an electrolyte may rapidly and easily permeate an inside of the positive electrode active material layer, and may uniformly permeate the inside of the active material layer without occurrence of a portion thereof that is not wet by the electrolyte. As a result, charging may occur over an entire surface of the positive electrode active material layer, and thus battery characteristics may be further enhanced.

In addition, in the positive electrode for a secondary battery, a packing density required in the positive electrode active material layer may vary according to the type of used positive electrode active material. Accordingly, in particular, in the positive electrode for a secondary battery, according to an embodiment of the present invention, when the positive electrode active material layer includes a lithium nickel manganese cobalt-based oxide as a positive electrode active material, the positive electrode active material layer may have a packing density of 3.0 g/cc or more, more particularly, 3.1 g/cc to 3.6 g/cc, and may have an average pore diameter of 0.1 μm to 0.3 μm, more particularly, 0.1 μm to 0.2 μm, at the packing density. In addition, when the positive electrode active material layer includes a lithium cobalt-based oxide as a positive electrode active material, the positive electrode active material layer may have a packing density of 3.0 g/cc or more, in particular, 3.9 g/cc to 4.3 g/cc, and, more particularly, 3.9 g/cc to 4.2 g/cc, and may have an average pore diameter of 0.1 μm to 0.3 μm, and, more particularly, 0.1 μm to 0.2 μm, at the packing density.

In addition, in the positive electrode for a secondary battery, according to an embodiment of the present invention, the positive electrode active material layer exhibits a peak within a pore diameter range of 30 nm to 2,500 nm under the above-described packing density conditions when the pore size distribution is measured by mercury intrusion porosimetry.

In addition, the positive electrode active material layer exhibits a maximum peak within a pore diameter range of 250 nm to 330 nm under the above-described packing density conditions. Compared to a general positive electrode active material layer exhibiting a maximum peak with a pore diameter range of about 160 nm to about 170 nm at the same level of packing density, the positive electrode active material layer of the positive electrode for a secondary battery according to the present invention may have a large pore size even at a high packing density. Accordingly, an electrolyte may more rapidly or uniformly permeate the inside of the positive electrode active material layer.

In the present invention, pore size and pore size distribution (PSD) in the positive electrode active material layer may be measured by mercury (Hg) intrusion porosimetry from a pressure when pores are filled with Hg and a volume at this time.

As described above, in the positive electrode for a secondary battery, according to an embodiment of the present invention, an improved pore structure in the positive electrode active material layer may be realized through control of the conductive material constituting the positive electrode active material layer, furthermore, through control of the amounts, types, physical properties, or mixing ratio of the positive electrode active material, a dispersant, and, optionally, a binder, as well as the conductive material.

In particular, in the positive electrode active material layer of the positive electrode for a secondary battery according to an embodiment of the present invention, the positive electrode active material may include a lithium composite metal oxide including lithium and one or more metal selected from cobalt, manganese, nickel, and aluminum, as a compound (lithiated intercalation compound) capable of reversibly intercalating and deintercalating lithium.

More particularly, non-limiting examples of the lithium composite metal oxide include lithium-manganese-based oxides ($LiMnO_2$ and $LiMn_2O$), lithium-cobalt-based oxides ($LiCoO_2$), lithium-nickel-based oxides ($LiNiO_2$), lithium-nickel-manganese-based oxides ($LiNi_{1-Y}Mn_YO_2$ where $0<Y<1$ and $LiMn_{2-Z}Ni_ZO_4$ where $0<Z<2$), lithium-nickel-cobalt-based oxides ($LiNi_{1-Y}Co_YO_2$ where $0<Y<1$), lithium-manganese-cobalt-based oxides ($LiCo_{1-Y}Mn_YO_2$ where $0<Y<1$ and $LiMn_{2-Z}Co_ZO_4$ where $0<Z<2$), lithium-nickel-cobalt-manganese-based oxides ($Li(Ni_PCo_QMn_R)O_2$ where $0<P<1$, $0<Q<1$, $0<R<1$, and $P+Q+R=1$ and $Li(Ni_PCo_QMn_R)O_4$ where $0<P<2$, $0<Q<2$, $0<R<2$, and $P+Q+R=2$), and lithium-nickel-cobalt-manganese-other metal (M) oxides ($Li(Ni_PCo_QMn_RM_S)O_2$ where M is selected from the group consisting of Al, Cu, Fe, V, Cr, Ti, Zr, Zn, Ta, Nb, Mg, B, W, and Mo; and P, Q, R, and S are atomic fractions of the respective independent elements, wherein $0<P<1$, $0<Q<1$, $0<R<1$, $0<S<1$, and $P+Q+R+S=1$), and, among the above-listed compounds, any one compound or two or more of these compounds may be comprised.

In addition, in the lithium composite metal oxide, at least one of the metal elements except for lithium may be doped with one or two or more elements selected from the group consisting of Al, Cu, Fe, V, Cr, Ti, Zr, Zn, Ta, Nb, Mg, B, W, and Mo. As such, when the lithium composite metal oxide is further doped with the above metal element, wherein lithium is not doped, the positive electrode active material may have improved structural stability and, as a result, battery output characteristics may be enhanced. In this regard, the content of a doping element included in the lithium composite metal oxide may be appropriately adjusted within a range that does not deteriorate the properties of the positive electrode active material, in particular, 0.02 at % or less.

More particularly, in the positive electrode active material according to one embodiment of the present invention, the lithium composite metal oxide may include a compound represented by Formula 1 below:

$$Li_{1+a}Ni_xCo_yMn_zM_wO_2 \qquad \text{<Formula 1>}$$

wherein, in Formula 1, M may include one or two or more elements selected from the group consisting of Al, Cu, Fe, V, Cr, Ti, Zr, Zn, Ta, Nb, Mg, B, W, and Mo; and a, x, y, z, and w denote atomic fractions of the respective independent corresponding elements, wherein $-0.5<a<0.5$, $0<x<1$, $0<y<1$, $0<z<1$, $0<w<1$, and $0<x+y+z<1$.

In consideration of the significance of improvement effects according to a mixed use of the conductive material and the binder, the positive electrode active material may include the lithium composite metal oxide of Formula 1 where $0<x<1$, $0<y<1$, $0<z<1$, and $y+z<x$.

Among the compounds, in terms of the enhancement of capacity characteristics and stability of a battery, the lithium composite metal oxide may include, more particularly, $LiCoO_2$, or a lithium nickel manganese cobalt oxide (e.g., $LiNi_{0.6}Mn_{0.2}Co_{0.2})O_2$, $LiNi_{0.5}Mn_{0.3}Co_{0.2}O_2$, $LiNi_{0.8}Mn_{0.1}Co_{0.1}O_2$, or the like). In addition, in consideration of the significance of improvement effects according to control of the type and content ratio of elements constituting the lithium composite metal oxide, the lithium composite metal oxide may be $LiNi_{0.6}Mn_{0.2}Co_{0.2}O_2$, $LiNi_{0.5}Mn_{0.3}Co_{0.2}O_2$, $LiNi_{0.7}Mn_{0.15}Co_{0.15}O_2$, $LiNi_{0.8}Mn_{0.1}Co_{0.1}O_2$, or the like, and, among these oxides, any one or a mixture of two or more of these oxides may be used.

In addition, the type of the positive electrode active material is not particularly limited, and, in particular, the positive electrode active material may have various forms such as a spherical form, a polyhedral form, a fibrous form, a plate form, a flake form, and the like.

In addition, the positive electrode active material may have a mean particle diameter ($D_{50}$) of, in particular, 2 μm to 30 μm. When the mean particle diameter of the positive electrode active material is less than 2 μm, the dispersibility of the positive electrode active material in a positive electrode active material composition may be reduced due to agglomeration between positive electrode active material particles. When the mean particle diameter of the positive electrode active material is greater than 30 μm, the activity of the positive electrode active material may be reduced due to a decrease in specific surface area thereof. In consideration of the significance of improvement effects according to optimization of the mean particle diameter of the positive electrode active material, the mean particle diameter ($D_{50}$) of the positive electrode active material may range from 5 µm to 20 µm.

In addition, the positive electrode active material may have a bimodal type particle size distribution within the above mean particle diameter range. By having such particle size distribution, the positive electrode active material may have further increased packing density in the positive electrode active material layer, and thus, when the positive electrode active material is applied to a battery, capacity characteristics of the battery may be further enhanced.

In addition, the positive electrode active material may include a mixture of two or more of active materials having different forms or different particle sizes. In particular, the positive electrode active material may include a mixture of a first positive electrode active material having a mean particle diameter ($D_{50}$) of 2 µm to 10 µm and a second positive electrode active material having a mean particle diameter ($D_{50}$) exceeding 10 µm and equal to or less than 30 µm. As such, when the positive electrode active material includes a mixture of active materials having different particle sizes, the packing density of the positive electrode active material in the positive electrode active material layer may be increased, and thus, when the positive electrode active material is applied to a battery, capacity characteristics of the battery may be further enhanced.

In consideration of an increase in packing density in the positive electrode and an improvement effect of capacity characteristics of a battery according to inclusion of the mixture of active materials having different particle sizes, the positive electrode active material may include a first positive electrode active material having a mean particle diameter ($D_{50}$) of 2 µm to 10 µm and a second positive electrode active material having a mean particle diameter ($D_{50}$) exceeding 10 µm and equal to or less than 30 µm in a mixing weight ratio of 50:50 to 80:20, more particularly, 50:50 to 70:30.

In the present invention, the mean particle diameter ($D_{50}$) of the positive electrode active material may be defined as a particle diameter at 50% of a particle size distribution. In addition, the mean particle diameter ($D_{50}$) of the positive electrode active material may be measured using, for example, a laser diffraction method. In particular, positive electrode active material particles are dispersed in a solvent, and then are irradiated with ultrasonic waves having a frequency of about 28 kHz at an output of 60 W using a commercially available laser diffraction particle size measurement device (e.g., Microtrac MT 3000), and a mean particle diameter ($D_{50}$) at 50% of a particle diameter distribution may be obtained in the measurement device.

The amount of the positive electrode active material may range from 70 wt % to 99.5 wt % with respect to a total weight of the positive electrode active material layer based on a solid content. When the amount of the positive electrode active material is less than 70 wt %, capacity may deteriorate, and, when the amount of the positive electrode active material is greater than 99.5 wt %, adhesion of the positive electrode active material to an electrode current collector may be reduced due to a decrease in relative amounts of the binder and the conductive material, and conductivity of the positive electrode active material may be reduced.

In addition, in the positive electrode for a secondary battery according to an embodiment of the present invention, the positive electrode active material layer includes a conductive material.

The conductive material may be, in particular, carbon nanotubes, and, more particularly, may be bundle-type carbon nanotubes, units of which have an average strand diameter of 15 nm or less.

The carbon nanotubes refer to a secondary structure formed by aggregating carbon nanotube units to entirely or partially form a bundle form, wherein the carbon nanotube unit has a graphite sheet in the form of a cylinder having a nano-sized diameter, and has a $sp^2$ bonding structure. In this case, the graphite sheet may exhibit the characteristics of a conductor or semiconductor according to the wound angle and structure. The carbon nanotube units may be classified into single-walled carbon nanotubes (SWCNTs), double-walled carbon nanotubes (DWCNTs), and multi-walled carbon nanotubes (MWCNTs) according to the number of bonds constituting the walls, and the thinner the walls, the lower the resistance. Accordingly, a dispersion of the conductive material according to one embodiment of the present invention may include one selected from SWCNT units, DWCNT units, and MWCNT units, or two or more of these units.

Generally, carbon nanotubes may have different physical properties depending on the crystallinity, structure, and type of constituent units, and the structure and type of secondary particles consisting of the units, impurity-containing components included in the carbon nanotubes, and the like. Accordingly, by controlling any one of the above-described factors or a combination of two or more of these factors, carbon nanotubes may have physical properties required according to applications thereof.

In addition, when the diameter of the carbon nanotube unit as the conductive material for a secondary battery is too large, the absolute number of strands per volume reduces, and thus the amount of the conductive material used increases, and, accordingly, it may be difficult to fabricate an electrode with high energy density, and the fabricated electrode may also have a significantly increased pore diameter, resulting in reduced electrode density. On the other hand, when the diameter of the carbon nanotube unit is too small, it is difficult to disperse the carbon nanotube units, and thus dispersion preparation processability may deteriorate, and the dispersed carbon nanotube units or carbon nanotubes are buried in a space between positive electrode active material particles, and thus it is difficult to sufficiently form pores. Accordingly, in carbon nanotubes suitable for use in the present invention, the carbon nanotube units may have an average strand diameter of 15 nm or less. In addition, in consideration of the improvement in dispersibility of the conductive material according to control of the diameter of the units and an enhancement effect of solid-like properties, and an enhancement effect of coating stability of a composition for forming an electrode, obtained as a result thereof, the average strand diameter of the carbon nanotube units may range from 1 nm to 15 nm, more particularly, 3 nm to 12 nm.

In addition, as the length of the carbon nanotube units increases, electrical conductivity, strength, and lifespan characteristics of the positive electrode at room temperature and a high temperature may be enhanced. When the length of the carbon nanotube units is small, it is difficult to efficiently form a conductive path, and thus electrical conductivity of the positive electrode may be reduced. On the other hand, when the length of the carbon nanotube units is too large, dispersibility thereof may be reduced. Accordingly, in carbon nanotubes suitable for use in the present invention, the carbon nanotube units may have a length of 0.5 μm to 200 μm. In addition, when considering the diameter of the carbon nanotube units, the carbon nanotube units may have an aspect ratio of 10 to 80,000, more particularly, 20 to 50,000, wherein the aspect ratio is defined as the length of the carbon nanotube units (the length of a major axis passing the center of the unit) to the diameter of the carbon nanotube units (the length of a minor axis passing the center of the unit and perpendicular to the major axis).

In the present invention, the strand diameter and length of the carbon nanotube units may be measured using a field emission scanning electron microscope.

In addition, in the conductive material dispersion according to one embodiment of the present invention, as described above, the units of the carbon nanotubes have a small average diameter and a large aspect ratio, and thus may have a high BET specific surface area and exhibit excellent dispersibility. In particular, the BET specific surface area of the carbon nanotubes suitable for use in the present invention may range from 200 $m^2/g$ to 330 $m^2/g$, more particularly, 240 $m^2/g$ to 280 $m^2/g$.

In the present invention, the specific surface area of the carbon nanotubes is measured by the BET method, and, in particular, may be calculated from the amount of nitrogen gas adsorbed at a liquid nitrogen temperature (77 K) using BELSORP-mini II manufactured by BEL Japan.

In addition, in the conductive material dispersion according to one embodiment of the present invention, the carbon nanotubes may have an average value of a ratio (IG/ID) of the intensity (IG) of a maximum peak of a G band at 1,580±50 $cm^{-1}$ to the intensity (ID) of a maximum peak of a D band at 1,360±50 $cm^{-1}$ of 0.7 to 1.7 and a standard deviation of the ratio (IG/ID) of 1.3% to 2.0%, the intensities being obtained by Raman spectroscopy using a laser with a wavelength of 532 nm.

The Raman spectroscopy is a method of analyzing the structure of carbon nanotubes, and is effective in analyzing the surface state of carbon nanotubes. In the Raman spectrum of the carbon nanotubes, a peak appearing in the vicinity of a wavenumber of 1,580 $cm^{-1}$ is referred to as a G band, and the G band is a peak indicating $sp^2$ bonding of the carbon nanotubes and indicates carbon crystals without structural defects. On the other hand, a peak appearing in the vicinity of a wavenumber of 1,360 $cm^{-1}$ is referred to as a D band, and the D band is a peak indicating $sp^3$ bonding of the carbon nanotubes, and increases when the atomic bond formed via $sp^2$ bonding is broken to form a $sp^3$ bond. Such a D band increases when disorder or defects are present in the carbon nanotubes, and thus the ratio (IG/ID) of the intensity (IG) of a maximum peak of the G band to the intensity (ID) of a maximum peak of the D band may be calculated to quantitatively evaluate the degree of disorder or defect formation.

In the present invention, the G band of the Raman spectrum of the carbon nanotubes may be a peak appearing around a wavenumber of 1,580±50 $cm^{-1}$, and the D band thereof may be a peak appearing around a wavenumber of 1,360±50 $cm^{-1}$. The wavenumber ranges of the G band and the D band correspond to ranges within which the G band and the D band can be shifted according to a laser light source used in Raman spectroscopy. Raman values used in the present invention are not particularly limited, but may be measured at a laser wavelength of 532 nm using a DXR Raman microscope (manufactured by Thermo Electron Scientific Instruments LLC).

Generally, a larger ratio of an integral value of a G band peak and an integral value of a D band peak indicates inclusion of a larger amount of amorphous carbon or poorer crystallinity of carbon nanotubes. In the present invention, however, the carbon nanotubes have an increased BET specific surface area and a bundle-type secondary shape, and thus have good crystallinity and the above-described average value and standard deviation of the ratio (IG/ID).

In addition, in the positive electrode for a secondary battery according to an embodiment of the present invention, the carbon nanotubes may include, as an impurity, a main catalyst or co-catalyst-derived metal element such as Co, Mo, V, Cr, or the like used in a process of preparing the same. In particular, the carbon nanotubes may include metal elements of Fe, Ni, and Mo from among the catalyst-derived metal elements, in a total amount of 3 mg/kg or less, more particularly, 2 mg/kg or less. More particularly, the carbon nanotubes may exclude at least one of the above-listed metal elements, i.e., Fe, Ni, and Mo, in particular, Fe. As such, the amounts of the metal elements as impurities remaining in the carbon nanotubes, in particular, the amount of Fe, may be significantly reduced, and thus higher conductivity may be obtained without the occurrence of side reactions in an electrode. In the present invention, the amounts of the metal impurities remaining in the carbon nanotubes may be analyzed using high-frequency inductively coupled plasma (ICP).

The above-described carbon nanotubes may be commercially available carbon nanotubes or directly prepared carbon nanotubes. The carbon nanotubes may be prepared using a general method such as an arc discharge method, a laser evaporation method, a chemical vapor deposition method, or the like, and the above-described physical properties of the carbon nanotubes may be achieved through control of the type of catalyst, heat treatment temperature, a method of removing impurities in the preparation process.

In particular, when a chemical vapor synthesis method is used, the carbon nanotubes may be prepared using a method including: preparing carbon nanotubes by bringing a supported catalyst, in which a metal catalyst is supported on a spherical α-alumina support, into contact with a carbon source while heating, and, optionally, removing metal impurities in the carbon nanotubes, according to need.

The preparation of the carbon nanotubes according to the chemical vapor synthesis method may be performed, more particularly, by growing carbon nanotubes by chemical vapor synthesis by introducing the supported catalyst into a horizontal fixed bed reactor or a fluidized bed reactor, and injecting a carbon source; or a mixed gas of the carbon source, a reducing gas (e.g., hydrogen or the like) and a carrier gas (e.g., nitrogen or the like) at equal to or greater than a pyrolysis temperature of the gaseous carbon source or equal to or less than a melting point of the supported metal catalyst to decompose the carbon source. The carbon nanotubes produced by the chemical vapor synthesis method have a crystal growth direction nearly parallel to the tube axis and a graphite structure thereof has high crystallinity in a tube longitudinal direction. As a result, the units of the carbon nanotubes have a small diameter, high electrical conductivity, and high strength.

In addition, the preparation of the carbon nanotubes may be performed at a temperature between equal to or greater than 500° C. and less than 800° C., more particularly, a temperature ranging from 550° C. to 700° C. When the reaction temperature is within the above temperature range, the generation of amorphous carbon is minimized, and the weight of the produced carbon nanotubes is reduced while maintaining a bulk size thereof, and thus dispersibility according to a decrease in bulk density may be further enhanced. As a heat source for the heat treatment process, induction heating, radiation heat, a laser, infrared rays (IR), microwaves, plasma, surface plasmon heating, or the like may be used.

In addition, carbon may be supplied as the carbon source, and the carbon source is not particularly limited as long as it can exist in a gaseous state at a temperature of 300° C. or more. In particular, the carbon source may be a carbon-based compound having six carbon atoms or less. More particularly, the carbon source may be carbon monoxide, methane, ethane, ethylene, ethanol, acetylene, propane, propylene, butane, butadiene, pentane, pentene, cyclopentadiene, hexane, cyclohexane, benzene, toluene, or the like, and any one of the above-listed carbon sources or a mixture of two or more of these carbon sources may be used.

After the growing of the carbon nanotubes by the above-described heat treatment process, optionally, a cooling process of more regularly aligning the carbon nanotubes may further be performed. The cooling process may be performed, in particular, by natural cooling according to removal of the heat source or using a cooler or the like.

Meanwhile, the supported catalyst used in preparing the conductive material is a supported catalyst in which a metal catalyst is supported on a spherical α-alumina support.

In this regard, α-alumina has very low porosity compared to γ-alumina, and thus is very unlikely to be used as a catalyst support. However, when carbon nanotubes are synthesized using α-alumina, the diameter of the carbon nanotubes may be increased by suppressing the generation of non-crystalline carbon and decreasing a specific surface area thereof through control of a calcination temperature at which the supported catalyst is formed. Simultaneously, dispersibility of the carbon nanotubes may be enhanced by reducing the bulk density of the carbon nanotubes.

In particular, the α-alumina suitable for use as a support in the present invention may have a mean particle diameter ($D_{50}$) of 20 μm to 200 μm and a BET specific surface area of 1 $m^2$/g to 50 $m^2$/g. In addition, the α-alumina may have very low porosity due to a smooth surface thereof, in particular, a porosity of 0.001 $cm^3$/g to 0.1 $cm^3$/g.

Meanwhile, the supported catalyst including the spherical α-alumina as a support may be prepared by supporting a metal catalyst on the spherical α-alumina support and then calcining the resulting support. In particular, the preparation of the supported catalyst may be performed by adding the spherical α-alumina support to a metal catalyst precursor solution prepared by dissolving a precursor of the metal catalyst in water and mixing the resulting solution, followed by calcination at a temperature of 600° C. or less.

The metal catalyst supported on the support helps carbon components present in a gaseous carbon source bind together and form a six-membered ring structure. As the metal catalyst, a main catalyst such as iron, nickel, cobalt, or the like may be used alone, or a co-catalyst such as molybdenum, vanadium, chromium, or the like may be used in combination with the main catalyst in the form of a composite of the main catalyst and the co-catalyst. In particular, the composite catalyst may be FeCO, CoMo, CoV, FeCoMo, FeMoV, FeV, FeCoMoV, or the like, and any one of the composite catalysts or a mixture of two or more of these composite catalysts may be used. In addition, the co-catalyst may be used in an amount of 0.01 mole to 1 mole, more particularly, 0.05 mole to 0.5 moles, with respect to 1 mole of the main catalyst.

The precursor of the metal catalyst suitable for use in preparation of the supported catalyst may be a water-soluble metal salt, a water-soluble metal oxide, or the like. In particular, the precursor of the metal catalyst may be a metal salt, a metal oxide, or a metal halide that includes one or two or more metal elements selected from Fe, Ni, Co, Mo, V, and Cr, and any one thereof or a mixture of two or more of these precursors may be used. More particularly, the precursor of the metal catalyst may be any one or a mixture of two or more selected from the group consisting of $Co(NO_3)_2.6H_2O$, $CO_2(CO)_8$, $[Co_2(CO)_6(t\text{-}BuC\!\!=\!\!CH)]$, $Cu(OAc)_2$, $Ni(NO_3)_2.6H_2O$, $(NH_4)_6Mo_7O_{24}.4H_2O$, $Mo(CO)_6$, $(NH_4)MoS_4$, and $NH_4VO_3$.

The precursor of the metal catalyst may be in a form of an aqueous solution dissolved in water. In this case, in consideration of impregnation efficiency, and the like, the concentration of the precursor of the metal catalyst in the aqueous solution may be appropriately adjusted. In particular, the concentration of the precursor of the metal catalyst in the aqueous solution may range from 0.1 g/ml to 0.4 g/ml.

In addition, the amount of the spherical α-alumina support mixed with the precursor of the metal catalyst may be appropriately determined in consideration of the amount of the support in the finally produced supported catalyst.

In addition, optionally, an acid may further be used when the support is added to and mixed in a precursor solution of the metal catalyst to control the bulk density of the carbon nanotubes. As such, when an acid is further added, the precursor solution of the metal catalyst may be used in an amount corresponding to 3 moles to 40 moles, more particularly, 5 moles to 30 moles of the metal catalyst with respect to 1 mole of the acid. In particular, the acid may be citric acid, or the like, and any one or a mixture of two or more of these acids may be used.

Meanwhile, the mixing of the precursor solution of the metal catalyst and the spherical α-alumina support may be performed using a general method, in particular, by rotation or stirring at a temperature ranging from 45° C. to 80° C.

In addition, the precursor of the metal catalyst and the support may be mixed together in consideration of the amount of the metal catalyst supported in the finally prepared supported catalyst. In the supported catalyst, as the amount of the metal catalyst supported increases, the bulk density of the carbon nanotubes produced using the supported catalyst tends to increase. Accordingly, the metal catalyst may be mixed with the support to be supported in an amount of 5 wt % to 30 wt % with respect to a total weight of the finally prepared supported catalyst, in consideration of the bulk density of the produced carbon nanotubes.

In addition, after the mixing of the precursor solution of the metal catalyst and the spherical α-alumina support, optionally, a drying process may further be performed prior to the calcination process. The drying process may be performed using a general method, in particular, by rotary evaporation in vacuum at a temperature ranging from 40° C. to 100° C. for 3 minutes to 1 hour.

Subsequently, the resulting mixture of the metal catalyst precursor and the support is calcined. The calcination process may be performed in an air atmosphere or in an inert air atmosphere at a temperature of 600° C. or less, in particular, from 400° C. to 600° C.

In addition, after the drying process and before the calcination process, optionally, a pre-calcination process may further be performed at a temperature ranging from 250° C. to 400° C.

In this case, when considering reaction efficiency, a maximum 50% of the mixture of the metal catalyst precursor and the support may be used in the form of the α-alumina support impregnated with the metal catalyst precursor right before the pre-calcination process, and the remainder of the mixture may be used in the form of the α-alumina support impregnated therewith right after the pre-calcination process.

A process of removing metal catalyst-derived metal impurities remaining in the carbon nanotubes prepared by the above-described preparation process may further be performed optionally. In this case, the removing of the metal impurities may be performed using a general method such as by washing, acid treatment, or the like.

The carbon nanotubes prepared by the above-described preparation process are of a bundle type, and may exhibit excellent dispersibility and conductivity due to a small strand diameter thereof when used to fabricate an electrode. In addition, the carbon nanotubes have high purity, and thus have increased conductivity in an electrode and, when applied to a battery, the carbon nanotubes may enhance battery performance, in particular, battery output characteristics at a low temperature.

Meanwhile, in the positive electrode for a secondary battery according to an embodiment of the present invention, the positive electrode active material layer includes a dispersant to increase the dispersibility of the conductive material.

The dispersant may be a nitrile-based rubber, more particularly, a partially or completely hydrogenated nitrile butadiene-based rubber.

In particular, the hydrogenated nitrile butadiene-based rubber includes a conjugated diene-derived structural unit, a hydrogenated conjugated diene-derived structural unit, and an α,β-unsaturated nitrile-derived structural unit. The hydrogenated nitrile butadiene-based rubber may include 20 wt % to 80 wt % of the hydrogenated conjugated diene-derived structural unit with respect to a total weight of the rubber. When the amount of the hydrogenated conjugated diene-derived structural unit is within the above range, miscibility thereof with a solvent increases, and thus the dispersibility of the carbon nanotubes may be increased and solid-like properties of the conductive material dispersion may also be improved, and, as a result, coating stability of the composition for forming an electrode may be enhanced. More particularly, the hydrogenated nitrile butadiene-based rubber may include 40 wt % to 70 wt % of the hydrogenated conjugated diene-derived structural unit.

In addition, in consideration of the improvement in dispersibility of the carbon nanotubes and miscibility with a solvent, the amount of the α,β-unsaturated nitrile-derived structural unit in the partially hydrogenated nitrile butadiene-based rubber may range from 10 wt % to 50 wt %, in particular, 20 wt % to 40 wt %, with respect to the total weight of the rubber. When the amount of the α,β-unsaturated nitrile-derived structural unit is within the above range, the dispersant may increase the dispersibility of the carbon nanotubes, and may impart high conductivity even when the amount of added carbon nanotubes is small.

In consideration of the effects of improving the solid-like properties of the conductive material dispersion according to control of the amounts of the repeating unit structures constituting the rubber and improving the coating stability of the composition for forming an electrode which includes the same, the hydrogenated nitrile butadiene-based rubber may be a partially hydrogenated nitrile butadiene-based rubber including: 10 wt % to 50 wt % of a conjugated diene-derived structural unit; 20 wt % to 80 wt % of a hydrogenated conjugated diene-derived structural unit; and 10 wt % to 50 wt % of an α,β-unsaturated nitrile-derived structural unit, with respect to the total weight of the rubber.

In the present invention, the amount of a nitrile structure-containing repeating unit in the hydrogenated nitrile butadiene-based rubber is a ratio of the weight of the α,β-unsaturated nitrile-derived structural unit to the total weight of the rubber, and the corresponding amount is measured according to a mill oven method of JIS K 6364, wherein the amount of generated nitrogen is measured, a binding amount thereof is calculated from the molecular weight of acrylonitrile, and the corresponding amount is obtained as a median of the quantified values.

In addition, the hydrogenated nitrile butadiene-based rubber may be prepared by copolymerizing an α,β-unsaturated nitrile, a conjugated diene, and, optionally, other copolymerizable termonomers, and then hydrogenating C=C double bonds in the resulting copolymer. In this case, the polymerization reaction process and the hydrogenation process may be performed using general methods.

The α,β-unsaturated nitrile suitable for use in preparation of the hydrogenated nitrile butadiene-based rubber may be, in particular, acrylonitrile, methacrylonitrile, or the like, and one or a mixture of two or more of these materials may be used.

In addition, the conjugated diene suitable for use in preparation of the hydrogenated nitrile butadiene-based rubber may be, in particular, a conjugated diene with 4 to 6 carbon atoms, such as 1,3-butadiene, isoprene, 2,3-methylbutadiene, or the like, and any one of the above-listed materials or a mixture of two or more thereof may be used.

In addition, non-limiting examples of the other copolymerizable termonomers optionally used include aromatic vinyl monomers (e.g., styrene, α-methylstyrene, vinylpyridine, and fluoroethyl vinyl ether), α,β-unsaturated carboxylic acids (e.g., acrylic acid, methacrylic acid, maleic acid, and fumaric acid), esters or amides of α,β-unsaturated carboxylic acids (e.g., methyl(meth)acrylate, ethyl(meth) acrylate, n-dodecyl (meth)acrylate, methoxymethyl (meth) acrylate, hydroxyethyl (meth)acrylate, and polyethylene glycol (meth)acrylate), anhydrides of α,β-unsaturated dicarboxylic acids (e.g., maleic anhydride, itaconic anhydride, and citraconic anhydride).

In the hydrogenated nitrile butadiene-based rubber prepared according to the above-described method, the amounts of the a43-unsaturated nitrile-derived structural unit, the conjugated diene-derived structural unit, the hydrogenated conjugated diene-derived structural unit, and, optionally, other copolymerizable termonomer-derived structural units may be varied within a wide range, and, in each case, a total amount of the above-described structural units is 100 wt %.

In addition, the hydrogenated acrylonitrile-butadiene rubber (H-NBR) may have a weight average molecular weight of 10,000 g/mol to 700,000 g/mol, more particularly, 10,000 g/mol to 300,000 g/mol. In addition, the partially hydrogenated acrylonitrile-butadiene rubber (H-NBR) may have a polydispersity index (PDI) of 2.0 to 6.0, in particular, 2.0 to 4.0, wherein the PDI is a ratio of Mw/Mn where Mw is a weight average molecular weight and Mn is a number average molecular weight. When the H-NBR has the weight average molecular weight and the polydispersity index within the above ranges, the dispersant may uniformly disperse the carbon nanotubes in a solvent. In the present invention, the weight average molecular weight and the number average molecular weight are molecular weights converted based on polystyrene, analyzed by gel permeation chromatography (GPC).

The dispersant may be included in an amount of 1 part by weight to 50 parts by weight with respect to 100 parts by weight of the carbon nanotubes. When the amount of the dispersant is less than 1 part by weight, it is difficult to uniformly disperse the carbon nanotubes in a dispersion, and, when the amount of the dispersant is greater than 50 parts by weight, processability may be deteriorated due to an increase in the viscosity of the dispersion. More particular, the amount of the dispersant may range from 10 parts by weight to 25 parts by weight.

In addition, in the positive electrode for a secondary battery according to an embodiment of the present invention, the positive electrode active material layer may further include a binder to adhere active material particles to each other and improve adhesion between the positive electrode active material and a current collector.

Non-limiting examples of the binder include polyvinylidenefluoride (PVDF), a polyvinylidenefluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene monomers (EPDMs), sulfonated EPDMs, styrene-butadiene rubber (SBR), fluorine rubber, and various copolymers thereof, and one of the above-listed materials or a mixture of two or more thereof may be used. The amount of the binder may range from 0.1 wt % to 30 wt % with respect to a total weight of the positive electrode active material layer.

The positive electrode for a secondary battery according to an embodiment of the present invention which has the above-described configurations may be fabricated by applying, on a positive electrode current collector, a composition for forming a positive electrode active material layer, prepared by dispersing a positive electrode active material, a conductive material, a dispersant, and, optionally, a binder in a solvent and drying and pressing the resulting current collector; or by casting the composition for forming a positive electrode active material layer on a separate support, and then laminating a film separated from the support on a current collector and pressing the resulting current collector.

In particular, the composition for forming a positive electrode active material layer may be prepared by preparing a conductive material dispersion by dispersing carbon nanotubes and a dispersant in a solvent, further adding a positive electrode active material and a binder thereto, and, if needed, a solvent, and mixing.

In the conductive material dispersion, the carbon nanotubes and the dispersant are the same as described above.

In addition, in the conductive material dispersion, non-limiting examples of the solvent include: amide-based polar organic solvents such as dimethylformamide (DMF), diethylformamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, and octanol; glycols such as ethylene glycol, diethylene glycol, triethylene glycol, propylene glycol, 1,3-propanediol, 1,3-butanediol, 1,5-pentanediol, and hexylene glycol; polyalcohols such as glycerin, trimethylol propane, pentaerythritol, and sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether; ketones such as acetone, methyl ethyl ketone, methyl propyl ketone, and cyclopentanone; and esters such as ethyl acetate, γ-butyl lactone, and ε-propiolactone, and any one of the above-listed solvents or a mixture of two or more thereof may be used. More particularly, in consideration of the dispersibility improvement effects for the carbon nanotubes and the dispersant, the solvent may be an amide-based polar organic solvent.

More particularly, the conductive material dispersion may include 1 part by weight to 50 parts by weight of the dispersant and 200 parts by weight to 9,900 parts by weight of the solvent, with respect to 100 parts by weight of the carbon nanotubes. When the amounts of the dispersant and the solvent are within the above ranges, the carbon nanotubes may be uniformly dispersed in the solvent. More particularly, the conductive material dispersion may include 10 parts by weight to 25 parts by weight of the dispersant and 4,000 parts by weight to 7,000 parts by weight of the solvent, with respect to 100 parts by weight of the carbon nanotubes.

In addition, the carbon nanotubes and the solvent may be mixed using a general mixing method, in particular, using a mixing device such as a homogenizer, a bead mill, a ball mill, a basket mill, an attrition mill, an all-purpose stirrer, a clear mixer, a TK mixer, or the like.

In addition, when mixing the carbon nanotubes with the solvent, cavitation dispersion treatment may be performed in order to increase miscibility of the carbon nanotubes with the solvent, or the dispersibility of the carbon nanotubes in the solvent. The cavitation dispersion treatment is a dispersion treatment method using shock waves generated by bursts of vacuum air bubbles formed in water when high energy is applied to a liquid, and, when this method is used, the carbon nanotubes may be dispersed without deterioration of the characteristics thereof. In particular, the cavitation dispersion treatment may be performed using ultrasonic waves or a jet mill, or by shear dispersion treatment.

The dispersion treatment process may be appropriately performed according to the amount of carbon nanotubes and the type of dispersant. In particular, when ultrasonic treatment is used, ultrasonic waves may have a frequency of 10 kHz to 150 kHz and an amplitude of 5 μm to 100 μm, and the irradiation time of ultrasonic waves may range from 1 minute to 300 minutes. An ultrasonic wave generating apparatus for performing the ultrasonic treatment process may be, for example, an ultrasonic homogenizer, or the like. In addition, when the jet mill treatment is performed, a pressure may range from 20 MPa to 250 MPa, and the jet mill treatment may be performed at least once, in particular, twice or more. In addition, an apparatus for the jet mill dispersion treatment may be a high pressure wet jet mill or the like.

A temperature at which the cavitation dispersion treatment is performed is not particularly limited, but the cavitation dispersion treatment may be performed at a temperature that does not cause a change in viscosity of the dispersion due to evaporation of the solvent. In particular, the cavitation dispersion treatment may be performed at a temperature of 50° C. or less, more particularly, from 15° C. to 50° C.

In addition, the mixing of the dispersant may be performed using a general mixing or dispersing method, in particular, by milling using a ball mill, a bead mill, a basket mill, or the like, or using a homogenizer, a bead mill, a ball mill, a basket mill, an attrition mill, an all-purpose stirrer, a clear mixer, a TK mixer. More particularly, the mixing of the dispersant may be performed by milling using a bead mill. In this case, the size of the bead mill may be appropriately determined according to the type and amount of carbon nanotubes and the type of dispersant, and, in particular, the bead mill may have a diameter of 0.5 mm to 2 mm.

In addition, when a dispersion stabilizer is optionally further used to prepare the dispersion, the dispersion stabilizer may be added in the dispersant mixing process. In this case, the method of preparing the conductive material dispersion according to one embodiment of the present invention may further include adding a dispersion stabilizer. The type and amount of the used dispersion stabilizer are the same as described above.

According to the above-described preparation method, a dispersion in which carbon nanotubes are uniformly dispersed in a solvent may be prepared.

In particular, in the conductive material dispersion according to one embodiment of the present invention, the carbon nanotubes and the dispersant may be included in the form of a uniformly dispersed carbon nanotube-dispersant composite in which the dispersant is introduced into surfaces of the carbon nanotubes via physical or chemical bonding. More particularly, the composite included in the conductive material dispersion may have a narrow particle size distribution of 10 or less, more particularly, from 2 to 6.5, the particle size distribution being obtained by Equation 2 below, and thus may exhibit higher and more uniform dispersibility.

Particle size distribution of carbon nanotube-dispersant composite = $(D_{90}-D_{10})/D_{50}$ [Equation 2]

wherein, in Equation 2, $D_{10}$, $D_{50}$, and $D_{90}$ refer to particle sizes at 10%, 50%, and 90%, respectively, of the particle size distribution of the carbon nanotube-dispersant composite.

More particularly, under conditions satisfying the above-described particle size distribution, $D_{10}$ of the particle size distribution of the composite may range from 1 μm to 5 μm, $D_{50}$ thereof may range from 3 μm to 15 μm, and $D_{90}$ thereof may range from 10 μm to 100 μm. More particularly, $D_{10}$ may range from 1 μm to 3 μm, $D_{50}$ may range from 4 μm to 15 μm, and $D_{90}$ may range from 10 μm to 30 μm.

In the present invention, the particle sizes $D_{10}$, $D_{50}$, and $D_{90}$ of the composite may be measured using a laser diffraction method, and, more particularly, may be measured by dispersing the composite in a solvent, irradiating the resulting dispersion with ultrasonic waves with a frequency of about 28 kHz at an output of 60 W using a commercially available laser diffraction particle size measurement device (e.g., Microtrac MT 3000), and obtaining mean particle diameters at 10%, 50%, and 90%, respectively, of the particle size distribution in the measurement device.

In addition, the conductive material dispersion may have a viscosity of 1,000 mPa·s to 20,000 mPa·s when measuring viscosity at a speed of 10 rpm using a Brookfield viscometer. As described above, the conductive material dispersion has lower viscosity than an existing one, and thus, when applied to fabricate an electrode, excellent dispersion properties may be obtained.

Next, a positive electrode active material, a binder, and, optionally, a solvent are added to the prepared conductive material dispersion and mixed to prepare a composition for forming a positive electrode active material layer.

In this case, the positive electrode active material and the binder are the same as those described above.

In addition, the solvent may be any solvent that is generally used in the art, for example, dimethyl sulfoxide (DMSO), isopropyl alcohol, N-methylpyrrolidone (NMP), acetone, water, or the like, and one of these solvents or a mixture of two or more thereof may be used. The solvent may be used in a sufficient amount to dissolve or disperse the positive electrode active material and the binder, and to have a viscosity that enables excellent thickness uniformity when the composition is applied for the fabrication of an electrode.

Next, the composition for forming a positive electrode active material layer is applied on a positive electrode current collector, and the resulting current collector is dried and pressed; or the composition for forming a positive electrode active material layer is cast on a separate support and a film separated from the support is laminated on a current collector, followed by pressing, thereby completing fabrication of a positive electrode.

First, in a case in which the positive electrode is fabricated by applying the composition for forming a positive electrode active material layer on the positive electrode current collector and drying and pressing the resulting current collector, the positive electrode current collector is not particularly limited as long as it does not cause any chemical change in the fabricated battery, and may be made of, for example, copper, stainless steel, aluminum, nickel, titanium, or calcined carbon; aluminum or stainless steel that is surface-treated with carbon, nickel, titanium, or silver; or the like. In addition, the current collector may generally have a thickness of 3 μm to 500 μm, and may have fine irregularities on a surface thereof to increase adhesion of the current collector to the positive electrode active material. For example, the current collector may be in any of various forms including a film, a sheet, foil, a net, a porous structure, a foam, non-woven fabric, and the like.

The applying of the composition for forming a positive electrode active material layer on the positive electrode current collector and the drying of the resulting current collector may be performed using general methods.

In particular, the applying process may be performed by a coating method such as spray coating, bar coating, or the like. In addition, the drying process may be performed by a general method such as natural drying, hot air drying, heat drying, or the like.

In this regard, manufacturing conditions such as applying speed, drying temperature, and the like in the applying and drying processes may affect the packing density of the prepared positive electrode active material layer.

Accordingly, in the present invention, the applying of the composition for forming a positive electrode active material layer may be performed, in particular, at an applying rate of 5 m/min to 50 m/min, more particularly, 10 m/min to 40 m/min In addition, the drying process may be performed at a temperature of 120° C. to 150° C., more particularly, 130° C. to 150° C.

When the applying rate and the drying temperature in the applying and drying processes are outside the above ranges, it is difficult to achieve the desired packing density required for the formed positive electrode active material layer, and side reactions may occur due to residual materials including a solvent, and the like and, accordingly, battery performance may deteriorate.

Subsequently, a film formed of the dried composition for forming a positive electrode active material layer is subjected to a pressing process.

The pressing process may be performed using any general method as long as it enables the above-described packing density to be achieved, in particular, a roll press method in which pressing is performed while maintaining a uniform thickness of the positive electrode through adjustment of a distance between upper and lower rolls.

According to another embodiment of the present invention, an electrochemical device including the above-described electrode is provided. The electrochemical device may be, in particular, a battery, a capacitor, or the like, and, more particularly, may be a lithium secondary battery.

In particular, the lithium secondary battery includes a positive electrode, a negative electrode facing the positive electrode, a separator disposed between the positive and negative electrodes, and an electrolyte, wherein at least one of the positive electrode and the negative electrode may be fabricated by an electrode composition including the conductive material dispersion. In addition, the lithium secondary battery may further optionally include a battery case to accommodate an electrode assembly consisting of the positive electrode, the negative electrode, and the separator, and a sealing member to hermetically seal the battery case.

In the lithium secondary battery, the separator may be any separator used in general secondary batteries as long as it separates the negative electrode from the positive electrode and provides a path for transfer of lithium ions. In particular, a separator having low resistance to ion transfer in an electrolyte and having an excellent electrolyte-retaining ability may be used. In particular, the separator may be a porous polymer film, for example, a porous polymer film formed of a polyolefin-based polymer, such as an ethylene homopolymer, a propylene homopolymer, an ethylene/butene copolymer, an ethylene/hexene copolymer, an ethylene/methacrylate copolymer, or the like, or a stacked structure having two or more layers formed of these materials. In addition, the separator may be a general porous non-woven fabric, for example, a non-woven fabric made of high melting point-glass fiber, polyethylene terephthalate fiber, or the like. In addition, to secure thermal resistance or mechanical strength, a separator coated with a ceramic component or a polymer material may also be used, and, optionally, a structure having one or more layers of these materials may be used.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, or the like, which may be used to manufacture lithium secondary batteries, but the present invention is not limited thereto.

In particular, the electrolyte may include an organic solvent and a lithium salt.

The organic solvent is not particularly limited as long as it can act as a medium through which ions participating in an electrochemical reaction of a battery migrate. Non-limiting examples of the organic solvent include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles represented by R—CN where R is a linear, branched, or cyclic $C_2$-$C_{20}$ hydrocarbon group, and may include a double bond aromatic ring or an ether bond; amides such as dimethylformamide; dioxolanes such as 1,3-dioxolane; and sulfolanes. Among these organic solvents, carbonate-based solvents are preferably used, and a mixture of a cyclic carbonate having high ion conductivity and high permittivity that enable enhancement of charge/discharge performance of a battery (e.g., ethylene carbonate, propylene carbonate, or the like) and a linear carbonate-based compound having low viscosity (e.g., ethyl methyl carbonate, dimethyl carbonate, diethyl carbonate, or the like) is more preferably used. In this case, the cyclic carbonate and a chain carbonate may be mixed in a volume ratio of about 1:1 to about 1:9 to achieve excellent electrolyte performance.

The lithium salt is not particularly limited as long as it is a compound capable of providing lithium ions that is used in lithium secondary batteries. In particular, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like. The concentration of the lithium salt may range from 0.1 M to 2.0 M. When the concentration of the lithium salt is within the above range, the electrolyte has appropriate conductivity and viscosity, and thus excellent electrolyte performance may be obtained, and lithium ions may effectively migrate.

To enhance battery lifespan characteristics, suppress a decrease in battery capacity, enhance battery discharge capacity, and the like, the electrolyte may further include, in addition to the above-described electrolyte components, for example, one or more additives selected from a haloalkylene carbonate-based compound such as difluoroethylene carbonate, and the like, pyridine, triethylphosphite, triethanolamine, cyclic ethers, ethylene diamine, n-glyme, hexaphosphoric acid triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, and the like. In this regard, the amount of the additive may range from 0.1 wt % to 5 wt % with respect to a total weight of the electrolyte.

A lithium secondary battery including an electrode fabricated using the conductive material dispersion according to the present invention may stably exhibit high discharge capacity, excellent output characteristics, and excellent capacity retention due to uniform dispersion of the conductive material in the electrode. Accordingly, the lithium secondary battery is suitable for use in portable devices such as mobile phones, notebook computers, digital cameras, and the like, and in electric vehicles (EVs) such as hybrid electric vehicles (HEVs) and the like.

Thus, according to another embodiment of the present invention, a battery module including the lithium secondary battery as a unit cell and a battery pack including the same are provided.

The battery module or the battery pack may be used as a power source of one or more mediu- and large-scale devices selected from power tools; EVs, HEVs, and plug-in HEVs (PHEVs); systems for storing power.

Hereinafter, examples of the present invention will be described in further detail in such a way that the invention can be easily carried out by one of ordinary skill in the art to which the present invention pertains. However, the present invention may be embodied in many different forms and is not limited to examples described below.

EXAMPLE 1

2 parts by weight of bundle-type carbon nanotubes having physical properties shown in Table 1 below and 1.0 part by weight of a hydrogenated nitrile butadiene-based rubber (the amount of α,β-unsaturated nitrile-derived structural unit: 35 wt %, the amount of hydrogenated conjugated diene-derived structural unit: 65 wt %, weight average molecular weight: 260,000 g/mol, and polydispersity index (PDI)=2.9) were added to 97.6 parts by weight of N-methylpyrrolidone (NMP) as a solvent, and then mixed using a homogenizing mixer (VMA LC55, Impeller/3000 rpm) for 1 hour. The resulting mixture was circulated using a NETZSCH bead mill (NETZSCH Mini-CER, bead size: 1 mm/3000 rpm) for 1 hour to obtain a carbon nanotube dispersion.

The prepared carbon nanotube dispersion, $LiNi_{0.8}Mn_{0.1}Co_{0.1}O_2$ ($D_{50}$=10 μm) as a positive electrode active material, and PVdF as a binder were mixed in a weight ratio of positive electrode active material: carbon nanotubes: binder of 98.1:0.4:1.5 to prepare a composition (viscosity: 15,000 mPa·s) for fabricating a positive electrode. The prepared composition was applied on an Al current collector at a rate of 10 m/min, and then dried at 130° C., and then roll-pressed under the following condition: a target packing density of 3.427 g/cc, thereby completing fabrication of a positive electrode. A positive electrode active material layer in the fabricated positive electrode had a packing density of 3.4 g/cc.

EXAMPLE 2

A positive electrode was fabricated in the same manner as in Example 1, except that a mixture of $LiNi_{0.6}Mn_{0.2}Co_{0.2}O_2$ (a mixing weight ratio=7:3) having different particle sizes of $D_{50}$=5 μm and $D_{50}$=11 μm was used as the positive electrode active material, the mixing weight ratio of positive electrode active material: carbon nanotubes: binder was changed to 97.8:0.8:1.4, and the roll-pressing process was performed under the following condition: a target packing density of 3.194 g/cc. The packing density of a positive electrode active material layer in the fabricated positive electrode was 3.1 g/cc.

EXAMPLE 3

A positive electrode was fabricated in the same manner as in Example 1, except that $LiCoO_2$ (XD20A™, manufactured by Yumi Core Corporation, $D_{50}$=16.5 μm, bimodal particle size distribution) was used as the positive electrode active material, the mixing weight ratio of positive electrode active material: carbon nanotubes: binder was changed to 97.8:0.3:0.9, and the roll-pressing process was performed under the following condition: a target packing density of 4.1 g/cc. The packing density of a positive electrode active material layer in the fabricated positive electrode was 4.1 g/cc.

COMPARATIVE EXAMPLE 1

A positive electrode was fabricated in the same manner as in Example 1, except that carbon black was used instead of the carbon nanotubes in Example 1, a mixing weight ratio of positive electrode active material: carbon black: binder was 96.7:1.6:1.7, and the roll-pressing process was performed under the following condition: a target packing density of 3.488 g/cc. The packing density of a positive electrode active material layer in the fabricated positive electrode was 3.4 g/cc.

COMPARATIVE EXAMPLE 2

A positive electrode was fabricated in the same manner as in Example 1, except that carbon black was used instead of the carbon nanotubes in Example 1, and a mixing weight ratio of positive electrode active material: carbon black: binder was 95:3:2. The packing density of a positive electrode active material layer in the fabricated positive electrode was 3.1 g/cc.

COMPARATIVE EXAMPLE 3

A positive electrode was fabricated in the same manner as in Example 1, except that carbon nanotubes having physical properties described below were used instead of the carbon nanotubes used in Example 1.

EXPERIMENTAL EXAMPLE 1

A shape of a secondary structure, an average diameter of units, crystallinity, purity, and BET specific surface area of the carbon nanotubes (CNTs) used in Example 1 and the CNTs used in Comparative Example 3 were measured using the following methods, and the results thereof are shown Table 1 below.

1) Shape and particle size of secondary structure of CNTs: Particle size of carbon nanotubes and a shape of a secondary structure thereof were observed using a scanning electron microscope (SEM).

2) Average diameter of CNT units: measured using an SEM and the BET method

3) Crystallinity (a ratio of IG/ID): An average value and standard deviation of a ratio (IG/ID) of the intensity (IG) of a maximum peak of a G band at 1575 nm to 1600 nm to the intensity (ID) of a maximum peak of a D band at 1340 nm to 1360 nm, the ID and the IG being obtained by Raman spectroscopy using a laser having a wavelength of 514.5 nm were calculated.

4) Purity: The purity of the carbon nanotubes was measured by an ash test.

5) BET specific surface area: obtained from the amount of nitrogen gas adsorbed at a liquid nitrogen temperature (77 K) using BELSORP-mini II manufactured by BEL Japan.

TABLE 1

| | | Example 1 | Comparative Example 3 |
|---|---|---|---|
| Shape of secondary structure of CNTs | | Bundle type | Bundle type |
| Average diameter of CNT units (nm) | | 8 | 20 |
| Crystallinity (ratio of IG/ID) | Average | 0.95 | 0.72 |
| | Standard deviation (%) | 1.64 | 2.12 |
| Purity (wt %) | | 100 | 99.5 |
| BET specific surface area (m$^2$/g) | | 249 | 245 |

EXPERIMENTAL EXAMPLE 2

Metal element content analysis was performed on the CNTs used in Example 1 and Comparative Example 3 through inductively coupled plasma (ICP) analysis using ICP-OEB (Optima-7300).

Specifically, a sample including the CNTs used in Example 1 and a sample including the CNTs used in Comparative Example 3 was accurately weighed and about 0.5 g of each sample was put into respective vials. 2 ml of concentrated sulfuric acid was added to the vials containing each sample. Each sample was carbonized by heating on a hot plate and dried. 3 ml of hydrochloric acid, 1 ml of nitric acid, and one droplet of hydrogen peroxide were added to the carbonized sample to decompose the sample. When the sample was completely decomposed, 200 μl (1,000 mg/kg) of internal standard water was added to the resulting sample, followed by dilution with 20 ml of ultrapure water. Each resultant sample was analyzed by ICP-OEB. The results thereof are shown in Table 2 below.

TABLE 2

|  |  | Example 1 | Comparative Example 3 |
|---|---|---|---|
| Metal contents (units: mg/kg) | Al | — | — |
|  | Co | <10 | — |
|  | Fe | — | 500 |
|  | Mo | — | — |
|  | Ni | — | 260 |
|  | V | <1 | — |

EXPERIMENTAL EXAMPLE 3

An electrolyte wetting experiment was performed on each of the positive electrodes fabricated according to Example 1 and Comparative Example 1.

Specifically, each of the positive electrodes of Example 1 and Comparative Example 1 was mounted on a flat plate in a light space to maintain a horizontal state and fixed thereto using adhesive tape. A syringe was filled with a propylene carbonate solvent or an applicable electrolyte up to a gradation of 10 μl such that air bubbles were not formed. The syringe filled with the propylene carbonate solvent or the applicable electrolyte was vertically fixed on a fixing stand, and was positioned on the central portion of the sample immobilized to the plate. The gradation of the syringe was checked and 1 μl of the sample was ejected by pushing the syringe, and it was checked with the naked eye as to whether the propylene carbonate solvent or the applicable electrolyte was at the tip of a syringe nozzle.

A stopwatch for time measurement was calibrated to zero, and then the syringe was slowly moved downward using a height adjuster of the stand for fixing a syringe until the PC solvent or the electrolyte at the tip of the syringe nozzle reached the surface of the sample. Immediately when the PC solvent or the electrolyte reached the surface of the sample, measurement started using the stopwatch. The syringe was moved upward from the sample by 30 mm or more using the height adjuster of the stand for fixing a syringe. To block the external environment, the sample was covered by a transparent petri dish lid. The time taken until a portion with dark contrast (an area impregnated with the PC solvent or the electrolyte) completely disappeared was checked and recorded.

In addition, the packing density of each of the positive electrodes of Example 1 and Comparative Example 1 was calculated using true densities of materials used in the positive electrode fabrication and thickness/weight of the electrode.

The results thereof are shown in Table 3 below.

TABLE 3

|  | Comparative Example 1 | Example 1 |
|---|---|---|
| Packing density (g/cc) | 3.4 | 3.4 |
| Propylene carbonate wetting time (sec) | 271 | 94 |

In addition, packing density and propylene carbonate wetting time of each of the positive electrodes fabricated according to Example 2 and Comparative Example 2 were measured using the same method as that used above. The results thereof are shown in Table 4 below.

TABLE 4

|  | Comparative Example 2 | Example 2 |
|---|---|---|
| Packing density (g/cc) | 3.1 | 3.1 |
| Propylene carbonate wetting time (sec) | 687 | 149 |

EXPERIMENTAL EXAMPLE 4

A pore size distribution of each of the positive electrodes of Example 2 and Comparative Example 2 was measured by mercury intrusion porosimetry. An average pore diameter (P) of an active material layer in each electrode was determined according to Equation 1 below. The results thereof and the packing density of the positive electrode active material layer in each electrode are shown in Table 5 below and FIG. 3.

$$\text{Average pore diameter }(P)\,(\mu m)=4V/A \quad [\text{Equation 1}]$$

wherein, in Equation 1, V denotes a pore volume, and A denotes a pore area.

TABLE 5

|  | Comparative Example 2 | Example 2 |
|---|---|---|
| Packing density | 3.1 g/cc | 3.1 g/cc |
| Medium pore diameter based on volume | 0.15964 μm | 0.28705 μm |
| Medium pore diameter based on surface area | 0.04463 μm | 0.09059 μm |
| Average pore diameter (P) | 0.09681 μm | 0.17114 μm |

As a result of measurement, the positive electrode active material layer of Example 2 exhibited an average pore diameter much larger than that of Comparative Example 2.

In addition, as illustrated in FIG. 3, a maximum peak (maximum pore size) of a pore diameter of the positive electrode active material layer of Comparative Example 2 appeared at 166.6 nm, while a maximum peak (maximum pore size) of a pore diameter of the positive electrode active material layer of Example 2 was increased to 311.1 nm, and an overall graph profile was shifted towards the larger pore diameter side.

From the above results, it can be confirmed that the positive electrode active material layer according to the present invention has a more improved pore structure even at high packing density.

MANUFACTURE EXAMPLE

Manufacture of Lithium Secondary Battery

A lithium secondary battery was manufactured using each of the positive electrodes of Examples 1 and 2.

Specifically, graphite as a negative electrode active material, carbon black as a conductive material, styrene butadiene rubber (SBR) as a binder, and carboxymethylcellulose (CMC) as a thickener were mixed in water in a weight ratio of 97:1:1:1 to prepare a composition for fabricating a negative electrode, and the composition was applied on a Cu current collector, thereby completing fabrication of the negative electrode.

A porous polyethylene separator was disposed between each of the positive electrodes manufactured according to Examples 1 and 2 and Comparative Examples 1 and 2 and the negative electrode to fabricate an electrode assembly, the electrode assembly was accommodated in a battery case, and then an electrolyte was injected into the case, thereby completing manufacture of a lithium secondary battery. In this case, the electrolyte was prepared by dissolving 1.0 M lithium hexafluorophosphate (LiPF$_6$) in an organic solvent consisting of ethylene carbonate (EC)/dimethyl carbonate (DMC)/ethyl methyl carbonate (EMC) in a mixing volume ratio of 3:4:3.

In addition, a lithium secondary battery was manufactured using one of the positive electrodes fabricated according to Example 3 and Comparative Example 3 according to the same method as that used above.

EXPERIMENTAL EXAMPLE 5

Mono-cells with the same capacity were manufactured using the positive electrodes (Example 2 and Comparative Examples 2) of Example 2 and Comparative Example 2 that were fabricated using the carbon nanotube dispersion, and the resistance of each mono-cell was measured when discharged at 25° C. and 150 A for 10 seconds on the basis of SOC 50% (cut off voltage: 1.9 V). The results thereof are shown in FIG. 4.

As a result of the experiment, the battery including the positive electrode of Example 2 exhibited a resistance lower than that of the battery including the positive electrode of Comparative Example 2, and thus can be expected to exhibit superior output characteristics.

EXPERIMENTAL EXAMPLE 6

Each of the lithium secondary batteries of Example 2 and Comparative Example 2 was subjected to 300 cycles of charging and discharging at a high temperature (45° C.), a driving voltage of 2.7 V to 3.8 V, and 1C/1C. A cycle capacity retention of each lithium secondary battery was measured, wherein the cycle capacity retention is a ratio of discharge capacity at the 300$^{th}$ cycle of charging and discharging at the high temperature to discharge capacity at the 1$^{st}$ cycle. The results thereof are shown in FIG. 5.

As a result of the experiment, the battery including the positive electrode of Example 2 exhibited lifespan characteristics similar to those of the battery including the positive electrode of Comparative Example 2.

The invention claimed is:

1. A positive electrode for a secondary battery, the positive electrode comprising a positive electrode active material layer comprising a positive electrode active material, a conductive material, and a dispersant,
    wherein the conductive material comprises bundle-type carbon nanotubes, units of which have an average strand diameter of 15 nm or less,
    wherein the carbon nanotubes have an average value of a ratio (IG/ID) of an intensity (IG) of a maximum peak of a G band at 1,580±50 cm$^{-1}$ to an intensity (ID) of a maximum peak of a D band at 1,360±50 cm$^{-1}$ of 0.7 to 1.7 and a standard deviation of the ratio of 1.3% to 2.0%, the ID and IG being obtained by Raman spectroscopy using a laser with a wavelength of 532 nm, and
    wherein the positive electrode active material comprises a lithium nickel manganese cobalt-based oxide, and
    the positive electrode active material layer has a packing density of 3.1 g/cc to 3.4 g/cc and has an average pore diameter of 0.1 μm to 0.3 μm at the packing density when a pore size distribution is measured by mercury intrusion porosimetry, the average pore diameter being calculated by Equation 1 below:

Average pore diameter $P=4V/A$    [Equation 1]

wherein, in Equation 1, V is a pore volume, and A is a pore area, and
    wherein the positive electrode active material layer exhibits a maximum peak within a pore diameter range of 250 nm to 330 nm at a packing density of 3.0 g/cc or more, the pore diameter range being measured by mercury intrusion porosimetry.

2. The positive electrode of claim 1, wherein the carbon nanotubes have a specific surface area of 200 m$^2$/g to 330 m$^2$/g.

3. The positive electrode of claim 1, wherein the dispersant comprises a hydrogenated nitrile butadiene-based rubber.

4. The positive electrode of claim 1, wherein the dispersant comprises a hydrogenated nitrile butadiene-based rubber comprising an α,β-unsaturated nitrile-derived structural unit in an amount of 10 wt % to 50 wt % with respect to a total weight of the rubber.

5. The positive electrode of claim 1, wherein the dispersant comprises a hydrogenated nitrile butadiene-based rubber comprising a hydrogenated conjugated diene-derived structural unit in an amount of 20 wt % to 80 wt % with respect to a total weight of the rubber.

6. The positive electrode of claim 1, wherein the dispersant comprises a partially hydrogenated nitrile butadiene-based rubber comprising: 10 wt % to 50 wt % of a conjugated diene-derived structural unit; 20 wt % to 80 wt % of a hydrogenated conjugated diene-derived structural unit; and 10 wt % to 50 wt % of an α,β-unsaturated nitrile-derived structural unit.

7. The positive electrode of claim 1, wherein the dispersant comprises a hydrogenated acrylonitrile-butadiene rubber having a weight average molecular weight of 10,000 g/mol to 700,000 g/mol and a polydispersity index of 2.0 to 6.0.

8. The positive electrode of claim 1, wherein the dispersant is included in an amount of 1 part by weight to 50 parts by weight with respect to 100 parts by weight of the carbon nanotubes.

9. The positive electrode of claim 1, wherein the positive electrode active material comprises a lithium composite metal oxide comprising lithium and at least one metal selected from the group consisting of cobalt, manganese, nickel, and aluminum.

10. The positive electrode of claim 9, wherein the lithium composite metal oxide is doped with one or two or more elements selected from the group consisting of Al, Cu, Fe, V, Cr, Ti, Zr, Zn, Ta, Nb, Mg, B, W, and Mo.

11. The positive electrode of claim 1, wherein the positive electrode active material has a mean particle diameter (D$_{50}$) of 2 μm to 30 μm.

12. The positive electrode of claim 1, wherein the positive electrode active material is a mixture of two or more positive electrode active materials having different mean particle diameters.

13. The positive electrode of claim 1, wherein the positive electrode active material comprises a mixture of a first positive electrode active material having a mean particle diameter ($D_{50}$) of 2 μm to 10 μm and a second positive electrode active material having a mean particle diameter ($D_{50}$) exceeding 10 μm and equal to or less than 30 μm.

14. The positive electrode of claim 1, wherein the positive electrode active material has a bimodal type particle size distribution.

15. A lithium secondary battery comprising the positive electrode of claim 1.

16. A battery module comprising the positive electrode of claim 1.

* * * * *